United States Patent [19]
Franklin et al.

[11] Patent Number: 6,126,383
[45] Date of Patent: Oct. 3, 2000

[54] APPARATUS FOR THE IN-LINE TURNING OF SELECTED ARTICLES

[75] Inventors: Joseph F. Franklin; Antonio Martinez, both of Montgomery; John D. Perez, Wetumpka; Cynthia E. Reinhardt, Fort Deposit, all of Ala.; John Wilkins, Cincinnati, Ohio

[73] Assignee: HK Systems, Inc., New Berlin, Wis.

[21] Appl. No.: 09/094,098

[22] Filed: Jun. 9, 1998

[51] Int. Cl.[7] ................................................. B65G 57/22
[52] U.S. Cl. ...................... 414/792; 198/374; 198/890.1; 198/440
[58] Field of Search ................................ 198/374, 890.1, 198/440, 817; 414/792, 792.1

[56] References Cited

U.S. PATENT DOCUMENTS

| | | |
|---|---|---|
| Re. 35,066 | 10/1995 | Martin . |
| 2,946,465 | 7/1960 | Raynor . |
| 2,947,405 | 8/1960 | Fenton . |
| 2,971,659 | 2/1961 | Miller, Jr. .................................. 214/6 |
| 3,139,965 | 7/1964 | Eggert ....................................... 198/31 |
| 3,245,557 | 4/1966 | Maramonte et al. . |
| 3,294,257 | 12/1966 | Davies et al. ............................. 214/6 |
| 3,420,385 | 1/1969 | Verrinder .................................. 214/6 |
| 3,523,601 | 8/1970 | Roth et al. . |
| 3,580,379 | 5/1971 | Shuster . |
| 3,599,789 | 8/1971 | Kurczak .................................... 209/74 |
| 3,677,389 | 7/1972 | Benatar et al. . |
| 3,757,971 | 9/1973 | Frish . |
| 3,938,653 | 2/1976 | Senger . |
| 3,954,190 | 5/1976 | Howard et al. . |
| 3,994,407 | 11/1976 | Von Gal, Jr. et al. . |
| 4,015,723 | 4/1977 | Beaty, Jr. et al. . |
| 4,024,965 | 5/1977 | Marth et al. . |
| 4,026,422 | 5/1977 | Leenaards . |
| 4,085,839 | 4/1978 | Crawford . |
| 4,522,292 | 6/1985 | Euverard et al. . |
| 4,807,739 | 2/1989 | Wolf et al. ............................... 198/415 |
| 4,883,162 | 11/1989 | Flot . |
| 5,139,388 | 8/1992 | Martin . |
| 5,195,627 | 3/1993 | Wyman . |
| 5,320,478 | 6/1994 | Gonsowski et al. ..................... 414/792 |
| 5,383,760 | 1/1995 | Cawley et al. . |
| 5,445,493 | 8/1995 | Yourgalite et al. . |
| 5,533,861 | 7/1996 | Klupfel ................................... 414/794.2 |
| 5,590,758 | 1/1997 | Wilkins et al. . |

*Primary Examiner*—Christopher P. Ellis
*Assistant Examiner*—Joe Dillon, Jr.
*Attorney, Agent, or Firm*—Michael Best & Friedrich LLP

[57] ABSTRACT

An article turner assembly for use with an article handling system such as a palletizer. The article turner assembly selectively turns articles conveyed in a single lane along a particular path so that each article may be turned or not as it is conveyed along that path. The article turner assembly includes a conveyor mechanism, an article turner, and a selector mechanism that acts on either the article turner itself, the conveyed articles, or both. The article turner is designed so that articles are turned without impact against their front or side surfaces or a reduction in their speed. The article turner includes two or more adjacent conveyors, which are run with a speed differential to turn articles. The orientation of and spacing between the conveyors can be adjusted to accommodate articles of different sizes and/or weights. The article turner assembly is well-suited for use with high speed palletizers because it can help form patterns of virtually any desired configuration at very high speeds.

24 Claims, 11 Drawing Sheets

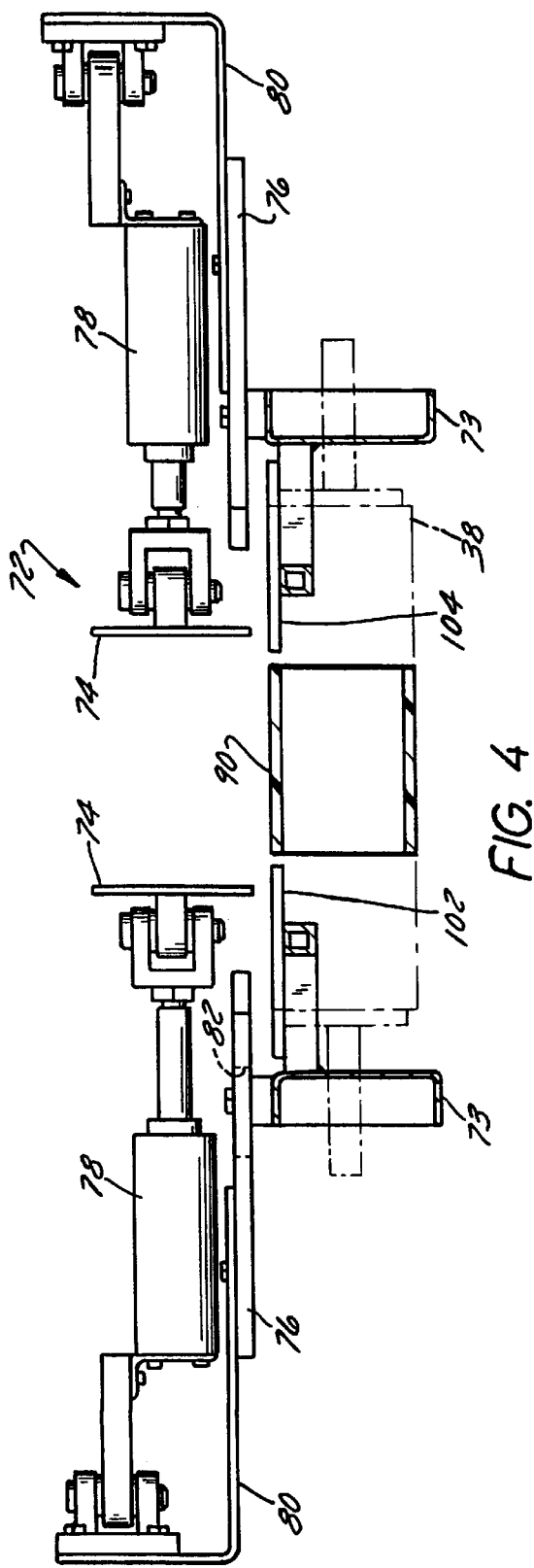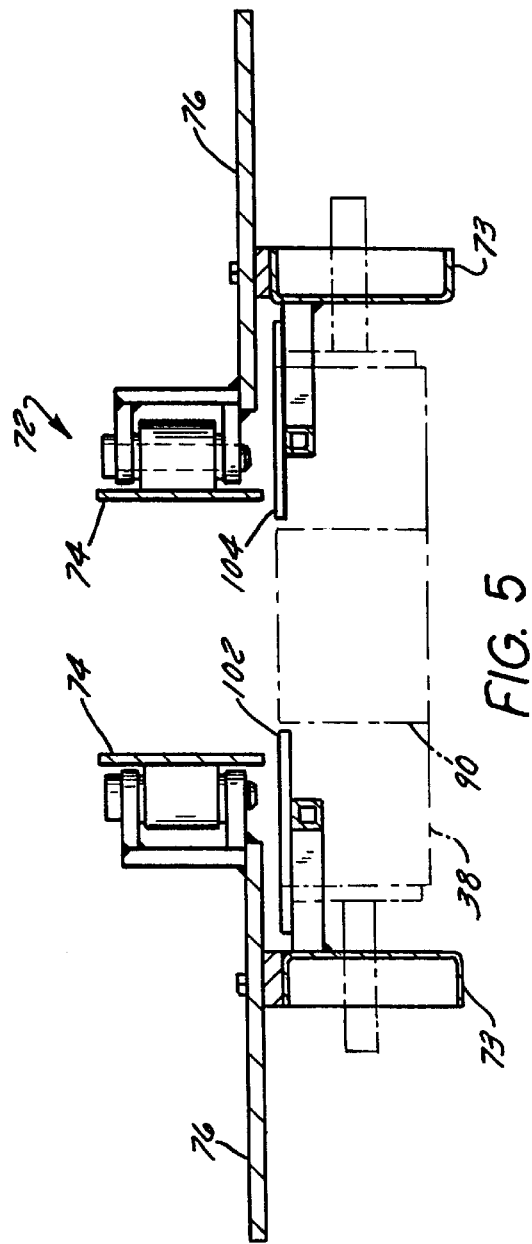

APPARATUS FOR THE IN-LINE TURNING OF SELECTED ARTICLES

BACKGROUND OF THE INVENTION

1. Field of the Invention

The invention relates to an article turner assembly for turning conveyed articles. More particularly, the invention relates to an apparatus and method for the in-line turning of selected articles as those articles are conveyed along a path of conveyance. The invention additionally relates to an apparatus and method for the high speed palletizing of articles using such an article turner assembly.

2. Background of the Invention

Article turner assemblies are well known for turning conveyed articles, i.e., for rotating the articles a designated amount, usually 90°, as they are conveyed along a path. Article turner assemblies have many applications in a variety of article handling applications. For instance, an articles turner assembly often is used as part of a pattern former of a palletizer. Palletizers are well-known for automatically or semi-automatically stacking layers of articles such as cartons or bags on a pallet, sheet, or other support. The typical palletizer includes vertically-spaced upper and lower conveyor assemblies which convey articles and supports, respectively.

The lower conveyor assembly of the typical palletizer includes a vertically-movable hoist (sometimes known as an indexing pallet hoist) that is raiseable to receive layers of articles one at a time from the upper conveyor assembly to form a stack and that indexes downwardly to receive each successive layer. The lower conveyor assembly may also include an outfeed conveyor for conveying a full stack away from the hoist as well as a staging mechanism and other equipment for conveying a stack of pallets, sheets, or other supports towards the hoist and for delivering the supports one at a time to the hoist.

The upper conveyor assembly of the typical palletizer is designed to 1) receive articles from an infeed conveyor, 2) form layers of articles suitable for stacking, and 3) deposit the layers one at a time onto the underlying indexing hoist. Cartons and most other articles typically are rectangular rather than square in shape. Secure stacking of these articles in layers usually requires that each layer of articles take the form of a pattern in which the articles have more than one orientation. Patterns are usually formed by turning some articles 90° as they are conveyed along the upper conveyor assembly. As a result of this pattern formation, each article of each successive layer can be supported by two or more articles of an underlying layer to form a more secure stack by interweaving the layers.

Article patterns are typically formed by a pattern former comprising an article turner assembly, a sorter, and an accumulator. The article turner assembly and sorter, in combination, divide a lane of incoming articles of common orientation into multiple lanes of articles in which at least some of the articles in at least one of the lanes is turned so as to be orientated differently from some of the articles in the remaining lanes. The lanes of articles are accumulated in the accumulator to form the patterns.

The article turner assembly of the pattern former is usually located downstream of the sorter because, unless they are activated and deactivated, most article turner assemblies are incapable of selectively turning articles in a given path while letting other articles pass along that path without being turned. This is particularly true in the case of high speed palletizers and other high speed article handling applications. If the operative component of the article turner assembly were located downstream of the sorter, the operative component would have to somehow be selectively activated and deactivated to effect the selective article turning required for pattern formation. This activation requirement would necessarily reduce the speed at which layers could be formed and is typically avoided by placing the article turner upstream of the sorter. Palletizers having some or all of these characteristics are disclosed, for example, in U.S. Pat. No. 2,947,405 to Fenton; U.S. Pat. No. 3,523,601 to Roth et al.; U.S. Pat. No. 4,026,422 to Leenaards; U.S. Pat. No. 3,954,190 to Howard et al.; and U.S. Pat. No. 5,320,478 to Gonowski et al.

Article turner assemblies used in palletizers and other article handling applications exhibit characteristics rendering them disadvantageous for use in many applications.

For instance, most article turner assemblies require contact between the operative element of the article turner assembly and a front and/or side surface of the article to turn the article. An example of an article turner assembly of this type is the so-called "bump" or "turnpost" turner an example of which is disclosed in U.S. Pat. No. 4,026,422 to Leenaards. In this type of article turner assembly, the article is conveyed so that the front surface of the article contacts a vertically-extending stationary turnpost and spins about the turnpost to effect the desired 90° of article rotation. The article impacts the turnpost with substantial force when the article is conveyed at high speeds. In the usual case in which the article comprises a package containing goods, this impact may result in substantial abrasion or other marring of the package and may damage goods stored in the package. Moreover, article turner assemblies of this type cannot operate on articles in a true in-line fashion because the spinning or rotation of the conveyed article about the stationary turnpost necessarily decelerates the article as it is turned. This deceleration necessarily reduces the maximum speed at which patterns can be formed with resultant reduction in the speed of downstream operations such as stacking. This characteristic of turnpost turners is problematic because high speed operation is becoming an increasingly-important concern in nearly every aspect of article conveyance. Any article turning operation that results in substantial article deceleration therefore is undesirable because it causes a bottleneck in the article handling process.

Some article turner assemblies are capable of turning articles without contact with a front or side surface of the article and hence present a lower risk of damage to conveyed articles. However, no previously-known article turner assembly of this type is capable of selectively and rapidly turning articles so as not to form a bottleneck in the article handling system and so as not to require multiple lanes for turned and unturned articles.

For instance, U.S. Pat. No. 3,580,379 to Shuster et al. discloses an article turner assembly that turns articles by shifting conveyor sections or carriers laterally relative to one another so that a front portion of the turned article is conveyed in one direction by a first series of carriers while the rear portion of the same article is supported on carriers which move in a different direction. The articles therefore simultaneously change orientation and change lanes. The speed of article turning necessarily is limited by the speed at which the carriers can be shifted. The resultant system is relatively complex and slow-acting.

Similarly, U.S. Pat. No. 5,195,627 to Wyman discloses an article turner assembly that relies on a speed differential between two sets of adjacent roller conveyors to turn articles. The speed of each set of roller conveyors is constant, and all articles on a particular path always contact all rollers in that path. Therefore, all articles conveyed along a particular path are either turned or not turned. The article turner assembly of the Wyman patent therefore must be located downstream of a sorter or lane former. System versatility therefore is substantially reduced and system complexity is substantially increased.

Still another example of an article turner assembly lacking a turnpost or similar structure is disclosed in U.S. Pat. No. 5,383,760 to Cawley et al., which relies on a speed differential between two parallel belt conveyors to turn articles. All conveyed articles are turned (assuming a designated speed differential exists between the two belts). System versatility therefore is substantially reduced compared to multi-lane systems.

At least one proposal has been made to selectively either turn or not turn articles without requiring a major path change of the conveyed articles for turning selection. Specifically, U.S. Pat. No. 4,024,965 to Marth et al. discloses a bag palletizer having an article turner assembly employing a turnpost as its operative element or article turner. A movable deflector bar is provided upstream of the turnpost to selectively either direct articles into engagement with the turnpost to turn them or to deflect articles around the turnpost so that they continue downstream without being turned. While this arrangement lacks some of the disadvantages of other, multiple-lane article turner assemblies, it still requires a substantial change in the direction of article conveyance depending on whether or not the article is turned. This change of direction necessarily increases the length of time required for an article to traverse the article turner assembly and reduces the maximum available speed for downstream operations such as pattern forming and palletizing. In addition, because a relatively long deflector bar is required to deflect unturned articles past the turnpost, articles must be conveyed through the article turner assembly with a substantial spacing that is at least as long as the deflector bar. This requirement additionally reduces the maximum speed of the article turner assembly. Moreover, by using a turnpost to effect article turning, the system of the Marth et al. patent exhibits all of the other disadvantages described above with respect to turnpost-based systems.

OBJECTS AND SUMMARY OF THE INVENTION

It is therefore a first principal object of the invention to provide a true in-line article turner assembly which is configured for use in a material handling application such as a pattern former of a palletizer, which is capable of selectively either turning articles or not turning articles, and which does not impart either a significant directional change or a significant speed change to articles traversing the article turner assembly.

In accordance with a first aspect of the invention, this object is achieved by providing an article turner assembly comprising a conveyor mechanism which conveys articles along a path in a single lane, and a selector mechanism. The selector mechanism acts on at least one of the article turner and conveyed articles so as to cause some articles to be turned by the article turner as they are conveyed along the path while permitting other articles to be conveyed along the path without being turned.

Another object of the invention is to provide an article turner assembly that meets the first principal object and that does not require contact between the article turner of the article turner assembly and a front or side surface of the turned article and hence cannot damage the article.

In accordance with another aspect of the invention, this object is achieved by configuring the article turner assembly such that the article turner comprises a moving surface of the conveyor mechanism.

Preferably, the conveyor mechanism includes at least first and second conveyors extending at least generally in parallel with one another and in which the second conveyor is driven at a different speed than the first conveyor so that differentially-moving conveying surfaces of the first and second conveyors, in combination, form the article turner. Moreover, the selector mechanism acts on articles and causes articles which are not to be turned to be conveyed by only the first conveyor and causes articles which are to be turned to be conveyed by both the first conveyor and the second conveyor.

More preferably, the second conveyor is positioned so that 1) articles which are directed onto the conveyor mechanism in an in-line orientation in which they do not contact the second conveyor and are not turned and 2) articles which are directed onto the conveyor mechanism in an altered orientation in which they contact the second conveyor and are turned. The selector mechanism preferably comprises a movable guide device which is disposed in the vicinity of an inlet of the conveyor and which is movable between 1) a first position in which it directs articles onto the conveyor mechanism in the in-line orientation and 2) a second position in which it directs articles onto the conveyor mechanism in the altered orientation.

Still another object of the invention is to provide an article turner assembly that meets the first principal object and that is adjustable to accommodate articles of different sizes and/or weights.

In accordance with another aspect of the invention, this object is achieved by mounting the second conveyor on a support assembly that permits adjustment of at least one of 1) an inclination of the second conveyor, 2) a height of the second conveyor, and 3) a spacing between a longitudinal centerline of the second conveyor and a longitudinal centerline of the first conveyor. Preferably, the support assembly comprises a lower frame, an upper frame on which the second conveyor is mounted, and first and second laterally-spaced linear actuators connecting the upper frame to the lower frame. The first and second linear actuators are operable, in conjunction with one another, to raise and lower the upper frame with respect to the lower frame and to vary an inclination of the upper frame with respect to the lower frame. The support assembly preferably further comprises a lateral adjust mechanism which is connected to the lower frame and which selectively moves the lower frame, the upper frame, and the second conveyor laterally with respect to the first conveyor.

A second principal object of the invention is to provide a high speed palletizer having an improved article turner assembly.

In accordance with still another aspect of the invention, this object is achieved by providing a high speed palletizer that includes an article turner assembly, a sorter which is disposed downstream of the article turner assembly and which sorts conveyed articles into multiple lanes of articles, an accumulator which is disposed downstream of the sorter and which accumulates the multiple lanes of articles into a layer of articles having a designated pattern, and a stripper which is disposed downstream of the accumulator and which selectively 1) receives the layer of articles from the accumulator and 2) stacks the layer onto a pallet disposed beneath the stripper. The article turner assembly includes a conveyor mechanism which conveys articles along a path in a single lane, an article turner, and a selector mechanism which acts on at least one of 1) the article turner and 2) conveyed articles so as to cause some articles to be turned as they are conveyed along the path while permitting other articles to be conveyed along the path without being turned.

A third principal object of the invention is to provide a method of selectively turning conveyed articles without significantly changing either the direction or speed of article conveyance during turning.

In accordance with yet another aspect of the invention, this object is achieved by conveying articles along a path in a single lane such that a designated portion of each article remains on a longitudinal centerline of the path, and, as the articles are being conveyed along the path, selectively turning only some of the articles while permitting other articles to be conveyed along the path without being turned.

Preferably, the selectively turning step comprises selectively altering at least one of 1) a position of a conveyor mechanism which conveys articles along the path and 2) an orientation of the articles.

Preferably, the altering step comprises orientating the articles relative to the path so that the orientation of each conveyed article is either 1) not altered so that the article does not contact the second conveyor and is not turned or 2) altered so that the article contacts the second conveyor and is turned by the speed differential between the first and second conveyors.

Another object of the invention is to provide a method that meets the third principal object and that turns articles without risk of damage to side or front edges thereof.

In accordance with yet another aspect of the invention, articles are turned by an article turner which contacts only a bottom surface of each turned article. The turning step preferably comprises conveying one portion of an article at a different speed than another portion.

Still another principal object of the invention is to provide an improved method of palletizing articles.

In accordance with still another aspect of the invention, this object is achieved by selectively turning conveyed articles in an article turner assembly, sorting articles received from the article turner assembly to form multiple lanes of articles, accumulating articles from the lanes of articles to form layers of articles each having a designated pattern, and stacking the layers of articles on a support to palletize the articles. The turning step comprises conveying articles along a path in a single lane, and, as the articles are being conveyed along the path, selectively turning only some of the articles while permitting other articles to be conveyed along the path without being turned.

Other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 4 is a sectional end elevation view of a selector mechanism of the turner assembly of FIG. 3, taken generally along the lines 4—4 in FIG. 3;

FIG. 5 is a sectional end elevation view of the selector mechanism, taken generally along the lines 5—5 in FIG. 3;

DETAILED DESCRIPTION OF THE PREFERRED EMBODIMENTS

1. Resume

Pursuant to the invention, an article turner assembly is provided for use with an article handling system such as a palletizer. The article turner assembly can selectively turn articles conveyed in a single lane along a particular path so that each article may either be turned or not turned as it is conveyed along that path. The article turner assembly includes a conveyor mechanism, an article turner, and a selector mechanism which acts on at least one of the article turner and the conveyed articles. The article turner preferably comprises a moving surface of the conveyor mechanism so that articles are turned without impact against front or side surfaces thereof and without slowing down. The moving surface of the conveyor mechanism preferably comprises two and even more preferably three adjacent conveyors relying on a speed differential therebetween to turn articles. The speed differential experienced by the article is eliminated for unturned articles, preferably by avoiding contact between the articles and at least one conveyor. The orientation of and spacing between the conveyors can be adjusted to accommodate articles of different sizes and/or weights. The article turner assembly is well-suited for use with high speed palletizers because it can help form patterns of virtually any desired configuration at very high speeds.

2. System Overview

The inventive article turner assembly is usable in virtually any article handing system in which articles must be selectively turned for the purpose of pattern forming, mixed load accumulation, orientation control for bar code labelling, etc. Therefore, while the invention is described primarily in conjunction with a palletizer, it should be understood that the invention is applicable to article handling systems other than palletizers such as mixed load accumulators and orientation controllers for bar code labelers.

Figure 1:
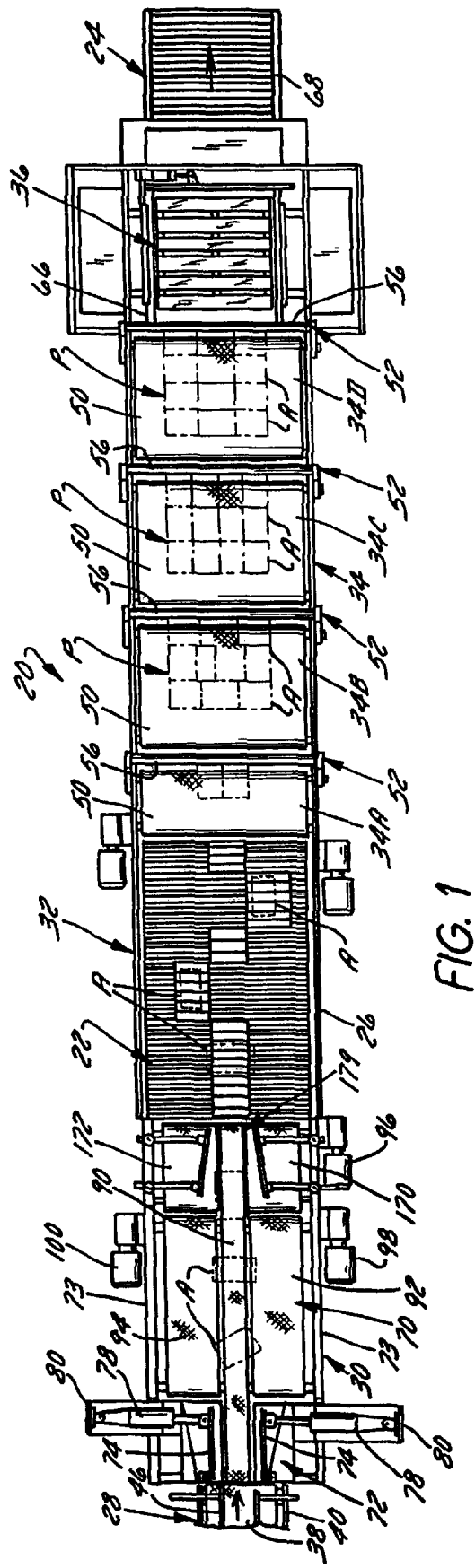
FIG. 1 is a top plan view of a high speed palletizer incorporating as part of a pattern former thereof an article turner assembly constructed in accordance with a preferred embodiment of the invention.
Figure 3:
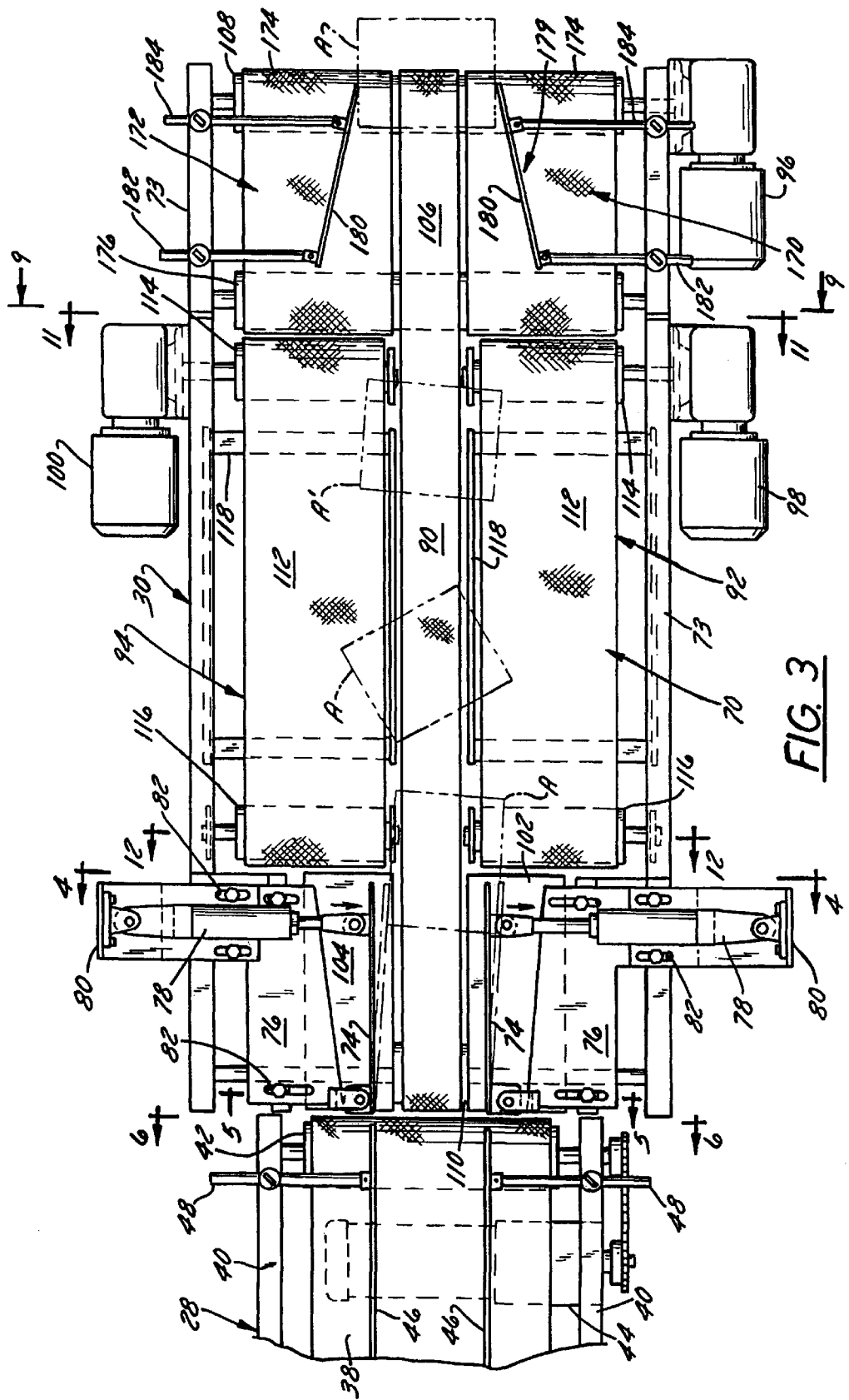
FIG. 3 is a top plan view of the article turner assembly of FIGS. 1 and 2.
Figure 6:
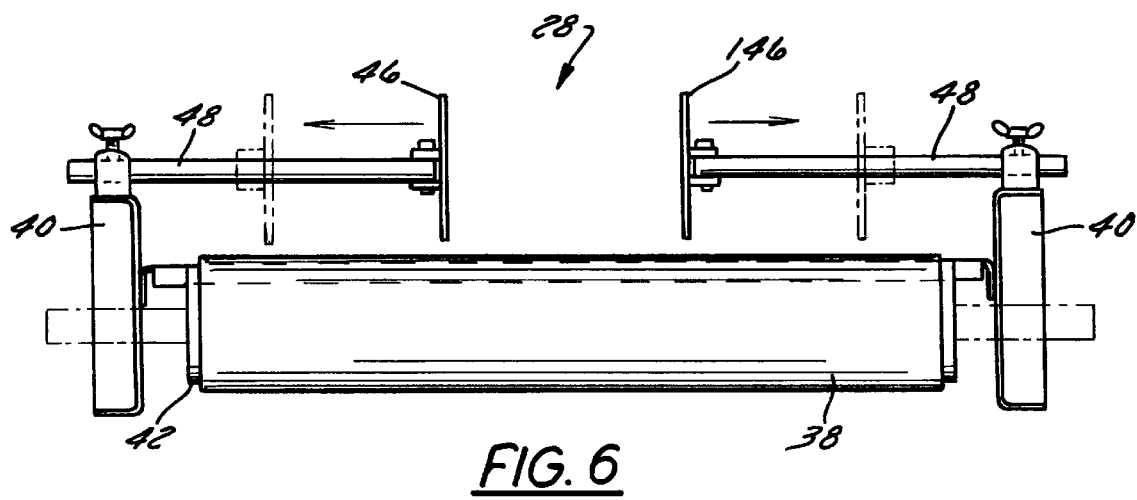
FIG. 6 is a sectional end view of the selector mechanism, taken generally along the lines 6—6 in FIG. 3.

Referring to FIGS. 1 and 3 by way of example, the articles A handled by the article turner assembly 30 are oblong (usually rectangular) in shape so as to have a relatively long, longitudinal dimension "X" and a relatively short, lateral dimension "Y." The orientation of these articles relative to the direction of article conveyance henceforth will be referred to as either "turned" or "unturned." In the typical installation, all articles that are conveyed into the article turner assembly assume the same initial or in-line orientation so that either their X dimension or Y dimension extends in parallel with the direction of article conveyance and so that the center of the article is generally colinear with the center of the conveyor mechanism 70. Each "unturned" article is conveyed through the article turner assembly without being rotated from its initial orientation. Each "turned" article is rotated from its initial orientation at a designated angle, usually 90°, with respect to an unturned article.

A high speed palletizer 20 with which the inventive article turner assembly 30 is applicable will now be described with reference to FIGS. 1 and 2. The illustrated high speed palletizer 20 is designed to handle cartons that store beverage containers or the like and to stack these cartons on a pallet. It should be understood, however, that the invention is equally applicable to palletizers for handling bags or other articles and for stacking those articles on sheets or plastic pallets or other supports. The illustrated palletizer 20 includes an upper conveyor assembly 22 for conveying articles such as cartons and a lower conveyor assembly 24 for conveying article supports such as pallets. Both conveyor assemblies 22 and 24 are mounted on a common frame 26 formed from a plurality of interconnected metal braces.

The upper conveyor assembly 22 is designed to receive articles in a single lane from an infeed conveyor 28, to arrange the received articles in predesignated patterns P suitable for forming layers of a stack, and to deposit these layers one at a time onto a pallet hoist 66 of the underlying lower conveyor assembly 24 to form a stack. The upper conveyor assembly 22 includes an article turner assembly 30, a sorter 32, an accumulator 34, and a stripper 36. All components of the upper conveyor assembly 22 operate at high speeds to palletize articles at a high speed of over 200 articles per minute and preferably of at least about 220 articles per minute.

Infeed conveyor 28 may comprise any conventional belt, roller, or chain conveyor configured to deliver unturned articles to the upper conveyor assembly 22 in a single lane. The illustrated infeed conveyor 28 comprises a belt conveyor having a discharge end disposed adjacent an inlet end of the article turner assembly 30. The infeed conveyor 28 comprises a belt 38 which is supported on a dedicated support frame 40 by pulleys 42 (only one of which is shown) and which is driven by a variable speed electric motor 44. Stationary guides flank the belt 38 for assuring in-line conveyance of the conveyed articles A. Each guide includes a guide bar 46 mounted on a plurality of longitudinally-spaced transverse rods 48. Each rod 48 is attached to the underlying support frame 40 by a set screw or similar device which permits lateral adjustment of the rod 48 relative to the underlying support frame 40 to permit the lateral spacing between the guide bars 46 to be adjusted accommodate articles of varying sizes.

The article turner assembly 30, sorter 32, and accumulator 34, in combination, define a pattern former that receives conveyed articles A from the infeed conveyor 28 and that forms designated patterns P that are suitable for stacking in layers. Successive patterns P typically will take different configurations so that, when the patterns P are subsequently deposited as layers onto the underlying hoist 66 by the stripper 36, each article of each successive layer is supported by two or more articles of an underlying layer to form a more secure stack by interweaving the layers. More specifically, the article turner assembly 30 receives the unturned articles from the infeed conveyor 28 and either turns or does not turn each article, depending upon the place that article is to take in the corresponding pattern. The sorter 32 receives articles from the article turner assembly 30 and divides the incoming articles into several different side-by-side lanes. The accumulator 34 receives articles from the sorter 32, accumulates these articles in the predesignated pattern to form the abovedescribed layers, and holds the layers for subsequent stacking on the pallet.

The article turner assembly 30 is detailed in Section 3 below.

The sorter 32 may comprise any suitable sorter or lane former and preferably comprises a so-called "slat sorter" of the type disclosed in U.S. Pat. No. 5,590,758, to Wilkins et al., the subject matter of which is hereby incorporated by reference in its entirety.

The accumulator 34 may comprise any suitable accumulation conveyor or a system of accumulation conveyors. Preferably, in order to maximize the versatility of the palletizer 20, the accumulator 34 comprises a plurality of accumulator substations 34B–34D which are arranged end-to-end with respect to one another and each of which is capable of accumulating a complete article layer. An additional substation 34A is located at the upstream end of the accumulator 34 to accumulate half an article layer preparatory to accumulating complete layers in each of the downstream substations 34B–34D. This arrangement permits layer formation to continue uninterrupted during a pallet changing operation or another timer period in which articles cannot be deposited onto an underlying pallet.

Each accumulator substation 34A–34D comprises a mat top belt conveyor 50 and an end stop 52 disposed at the downstream end of the mat top belt conveyor 50. Each mat top belt conveyor 50 is driven separately by a dedicated variable speed electric motor 54. The belt of each mat top conveyor 50 is designed to minimize rolling or sliding contact between the article and the conveyor 50 and hence to minimize abrasion of the article. A mat top belt suitable for these purposes is available, for example, from Intralox Corp. of Harahan, La.

Each end stop 52 is designed to selectively 1) arrest article movement at the end of the accumulator substation 34A–34D and 2) permit article passage to downstream conveyor assembly components while acting as a support surface bridging the gap between the accumulator substation and the next downstream accumulator substation or other upper conveyor assembly component. Each illustrated end stop 52 comprises a roller 56 or the like 1) extending across the upper surface of the associated conveyor 50 and 2) attached at each of its opposite ends to the upper end of a pivot arm 58. The lower end of the pivot arms 58 of each end stop 52 are attached to a suitable electric actuator 60. The actuator 60 associated with each end stop 52 is operable to swing the pivot arms 58 of that end stop 52 between 1) a lowered position illustrated in FIG. 2 in which the roller 56 bridges the gap between adjacent accumulator substations to act as a support surface for conveyed articles and 2) a raised position, best seen in FIG. 1, in which the roller 56 is engaged by articles to arrest their conveyance. Pivoting movement of the roller 56 of each end stop 52 from the raised position in FIG. 1 to the lowered position in FIG. 2 causes the roller 56 to move downwardly and outwardly away from the articles without impacting or jarring the articles and hence prevents damage to the articles.

The stripper 36 may comprise any device capable of alternately 1) supporting a layer of articles at a location over the hoist 66 and 2) moving out from under the layer of articles to deposit the layer onto the hoist. Single slide plate strippers or biparting slide plate strippers would suffice. The preferred stripper comprises an apron stripper the apron of which comprises a plurality of slats mounted on a reciprocating chain.

Figure 2:
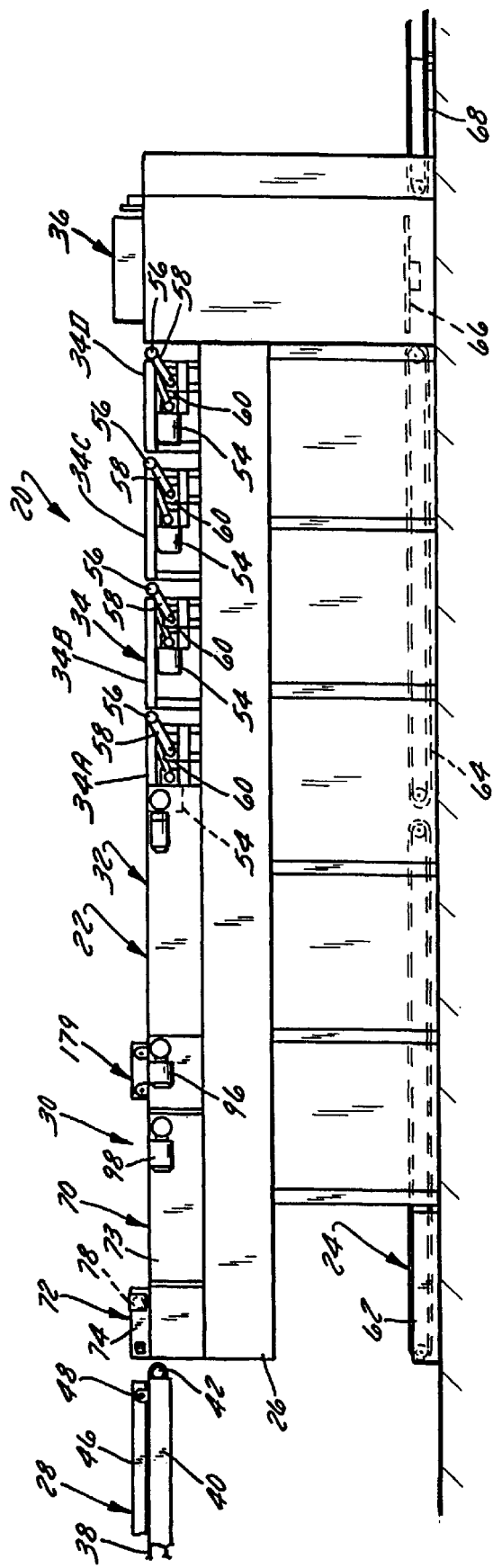
FIG. 2 is a side elevation view of the high speed palletizer of FIG. 1.

Referring now primarily to FIG. 2, the lower conveyor assembly 24 includes, from upstream end to downstream end thereof, a pallet conveyor 62, a staging conveyor or infeed conveyor 64, the hoist 66, and a discharge conveyor or outfeed conveyor 68. All components of the lower conveyor assembly 24 are conventional and therefore will not be described in detail.

In use, articles A are conveyed into the upper conveyor assembly 22 one at a time by the infeed conveyor 28, turned as necessary and separated into multiple lanes by the article turner assembly 30 and the sorter 32, and accumulated in patterns P of articles on the accumulator 34. The patterns P are then conveyed one at a time onto the stripper 36, which then moves out from under the pattern P to deposit it onto an underlying pallet on the hoist 66 as a layer. Simultaneously, the pallet conveyor 62 transfers a stack of pallets into the lower conveyor assembly 24, the staging or infeed conveyor 64 receives a single pallet for transfer to the hoist 66, the hoist 66 lifts empty pallets up to the stripper 36 for article stacking and then lowers loaded pallets back down to the level of the remaining conveyors of the lower conveyor assembly 24, and the discharge conveyor 68 conveys loaded pallets away from the palletizer 20.

3. Construction and Operation of Article Turner Assembly

The article turner assembly 30 has several advantageous characteristics. First, it can selectively turn articles conveyed in a single lane along a particular path so that each article may either be turned or not turned as it is conveyed along that path. Second, it turns articles without impacting any front or side surfaces of the articles and hence cannot damage those surfaces. Third, it turns articles without significantly changing the direction of article conveyance or decelerating article movement. Fourth, it does not require the synchronous action of any operative turner element for the selective article turning. The third and fourth benefits, in combination, render the article turner assembly 30 highly versatile and permit it to operate at very high speeds.

Referring now to FIGS. 3–12, the article turner assembly 30 includes a conveyor mechanism 70 and a selector mechanism 72. Both mechanisms 70 and 72 are mounted on a stationary support assembly that includes a pair of laterally spaced, longitudinally extending frames 73 mounted on the palletizer support frame 26 as best seen in FIG. 2. The conveyor mechanism 70 preferably comprises a differential-speed conveyor such as a split-belt conveyor so as to incorporate an article turner as a moving surface of the conveyor mechanism 70. The selector mechanism 72 acts on at least 1) the conveyed articles A and 2) an article turner (otherwise known as an operative element) of the article turner assembly 30 so as to cause some articles to be turned by the article turner assembly 30 as they are conveyed along the path of article conveyance while permitting other articles to be conveyed along the path without being turned. In the preferred and illustrated embodiment in which the article turner of the article turner assembly 30 is formed integrally with the conveyor mechanism 70, the selector mechanism 72 acts on the turned articles A as opposed to the article turner. Preferably, the determination of whether or not articles will be turned as they are conveyed along the conveyor mechanism 70 is based on the orientation of articles as they are fed into the conveyor mechanism 70, in which case the selector mechanism 72 alters the orientation of selected incoming articles from their initial in-line orientation so that those articles are engaged and turned by the article turner assembly 30. The altered orientation may comprise any orientation in which the article is contacted by the active portion of the article turner assembly. For instance, the altered position may be one in which the article is skewed with respect to the longitudinal centerline of the conveyor mechanism and/or one in which the article is shifted or offset slightly (typically on the order of less than one-to-two inches) from the longitudinal centerline of the conveyor mechanism. Article conveyance remains substantially in-line in either event so that there is little or no article deceleration as a result of article orientation alteration.

Referring now primarily now to FIGS. 3–6, the selector mechanism 72 preferably takes the form of a movable guide device which is disposed in the vicinity of the inlet end of the conveyor mechanism 70. At least a portion of the guide device is movable between 1) a first position in which it directs articles onto the conveyor mechanism 70 in a first, in-line orientation in which the articles are not subsequently turned and 2) a second position in which it directs articles onto the conveyor mechanism 70 in a second, altered orientation in which the articles are subsequently turned. The guide device preferably includes a pair of laterally-spaced guide members 74 each of which is pivotably mounted on a support plate 76 at an upstream end thereof. The illustrated guide members 74 comprise flat bars preferably formed from a low-friction material such as UHMW plastic or coated with a non-stick material. However, the flat bars forming the guide members 74 could be replaced with rollers or some other low-friction devices. A linear actuator 78 is attached to each guide member 74 downstream of the upstream end of the guide member 74. The linear actuators 78 are operable to move the guide members 74 from a first position in which both guide members 74 extend in parallel with the path of conveyance to a second position in which they both extend at the same acute angle with respect to the path of conveyance. As will become apparent below from a discussion of the conveyor mechanism 70, this acute angle is relatively small (on the order of less than 20°) because only a relatively small amount of article deflection is required to select between article turning and article not turning.

The linear actuators 78 preferably comprise pneumatic cylinders. Each cylinder is pivotably connected at a cylinder end thereof to a mounting bracket 80 and at a rod end thereof to the respective guide member 74. In the illustrated embodiment, each cylinder is extendable or retractable from a first, fully extended or retracted position in which it places the associated guide member 74 in its first position to a second, fully retracted or extended position in which it places the associated guide member 74 in its second position. Alternatively, the linear actuators 78 could additionally assume an intermediate or neutral position so as to be fully extendable one way with respect to the neutral position to deflect the article in a first direction and fully extendable the other way with respect to the neutral position to deflect the article in a second direction. In this, case, it would be desirable to be able to control the speeds of the second and third conveyors 92 and 94 (detailed below) so that the slowest-moving conveyor is always the first conveyor to be contacted by an article whose orientation is shifted by the selector mechanism 72. This arrangement would permit turned articles to extend in any of three directions to facilitate bar code labeling or a similar operation.

The support plate 76 and mounting bracket 80 on which the guide member 74 and linear actuator 78 on each side of the selector mechanism 72 are movable laterally relative to the underlying support frame 73. Specifically, each support plate and mounting bracket 80 are bolted to the underlying support frame 73 through elongated slots 82 that permit movement of the support plate 76 and mounting bracket 80 relative to the frame 73. This movement permits the spacing between the guide members 74 to be adjusted to accommodate articles of different widths.

The conveyor mechanism 70 relies on a speed differential thereacross to turn selected articles without impacting a front or side surface of the articles and while conveying the articles along the path of conveyance in a single lane without significant article deceleration. In the preferred and illustrated embodiment, the conveyor mechanism comprises a first, central conveyor 90 flanked by second and third conveyors 92 and 94 extending at least substantially in parallel with the first conveyor 90. The first, second, and third conveyors 90, 92, and 94 are driven independently by respective first, second, and third variable speed electric motors 96, 98, and 100 so that the second conveyor 92 runs slower than the first conveyor 90 and the third conveyor 94 runs faster than the first conveyor 90. The first conveyor 90 preferably is positioned with its conveying surface in a horizontal plane, and the second and third conveyors 92 and 94 preferably are usually inclined with respect to the first conveyor 90 so that the first, second, and third conveyors 90, 92, and 94, in combination, assume a generally V-shaped configuration when viewed from the end as best seen in FIGS. 10 and 13–15. This relationship helps assure that the center of gravity of each turning article is always positioned on or near (i.e., within a few inches of) the longitudinal centerline of the first conveyor 90. This relationship also assures 1) that the inner portions of the conveyors 92 and 94 will be positioned below the level of the conveyance surface of the conveyor 90 so that unturned articles do not contact the conveyors 92 and 94 and 2) the second conveyor 92 lifts and rotates turned articles so that sliding friction between the turned articles and the first conveyor 90 is reduced with consequent reduction in article marring. Moreover, because the turning forces are imposed on the articles near their edges rather than near their center, only relatively low turning forces are required to turn the articles. Accordingly, articles which are conveyed onto the conveyor mechanism 70 without their orientation being altered will be positioned entirely above the plane of the underlying portions of the second and third conveyors 92 and 94 and, accordingly, will not contact either of the second and third conveyors 92 and 94 and will not be turned. Conversely, articles which are conveyed onto the conveyor mechanism after their orientation is shifted by the selector mechanism 72 will be lifted and turned by the second and third conveyors 92 and 94 without marring the articles and with little or no article deceleration.

Each of the first, second, and third conveyors 90, 92, and 94 preferably comprises a standard belt conveyor. The belts 112 of the second and third conveyors 92 and 94 preferably are formed from a slightly tackier or softer material than the material of the belt 106 of the first conveyor 90 so as to securely grip turning articles without abrading or otherwise damaging them. The conveyors 90, 92, 94 now will be described in greater detail.

Figure 11:
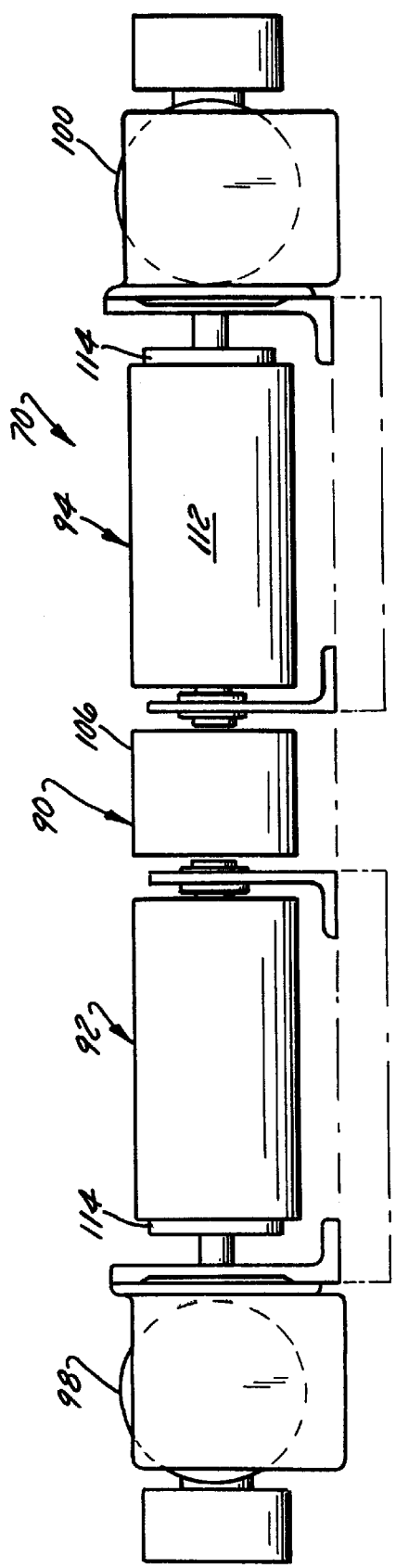
FIG. 11 is a sectional end elevation view of the conveyor mechanism, taken generally along the lines 11—11 in FIG. 3.
Figure 12:
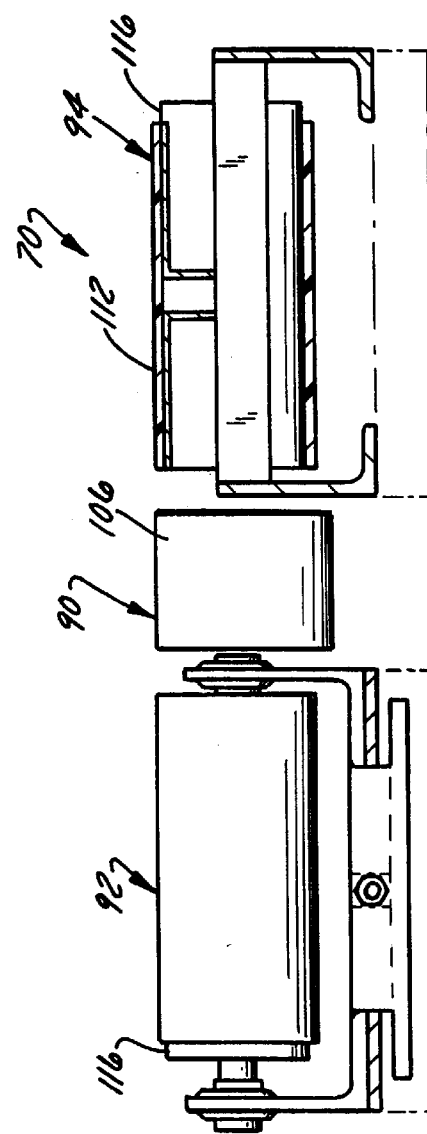
FIG. 12 is a sectional end elevation view of the conveyor mechanism, taken generally along the lines 12—12 in FIG. 3.
Figure 13:
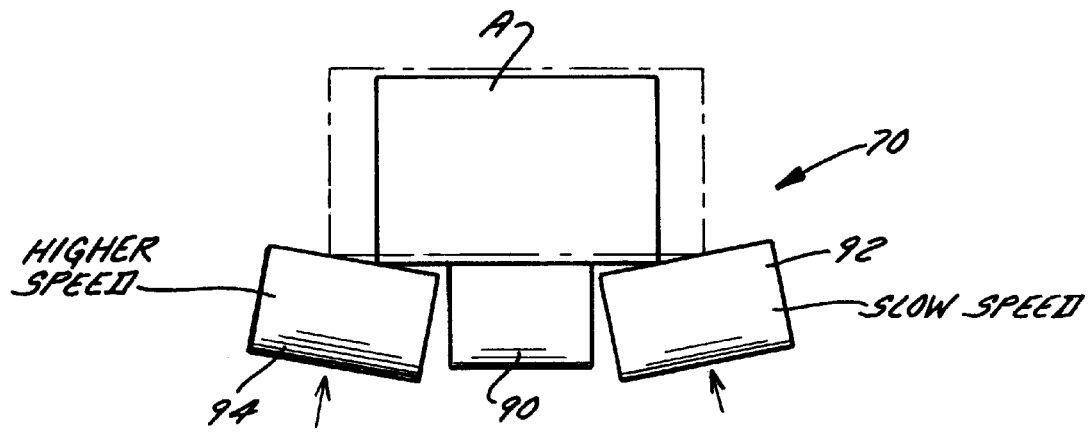
FIGS. 13–15 are schematic end elevation views of the conveyor mechanism, illustrating adjustment of the position thereof to accommodate packages of varying sizes and/or weights.
Figure 14:
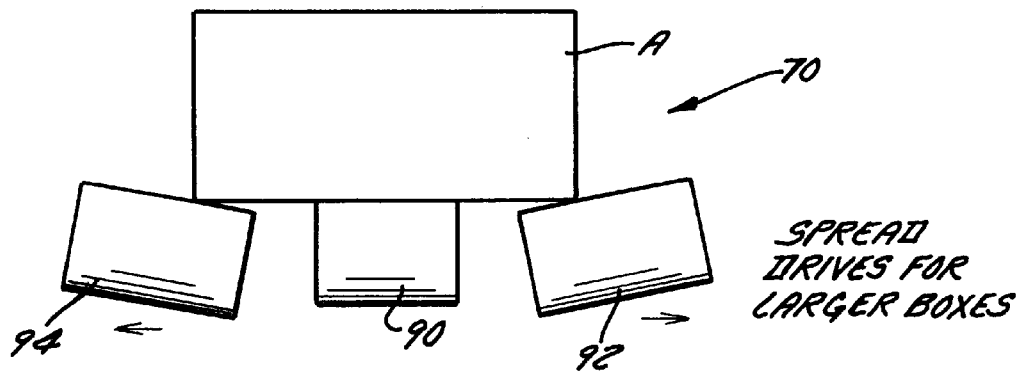
Figure 15:
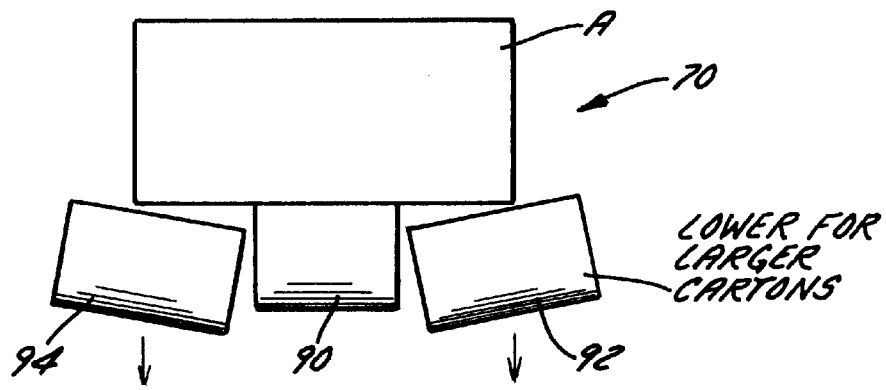

Referring especially to FIGS. 3, 11, and 12, the first conveyor 90 is longer than the second and third conveyors 92 and 94 so as to extend from an inlet end of the selector mechanism 72 to a position well beyond the discharge ends of the second and third conveyors 92 and 94. Slide plates 102 and 104 flank the inlet end of the first conveyor 90 to help support articles being conveyed through the selector mechanism 72. A belt 106 of the first conveyor is supported at its upstream end by an idler pulley 110 and is driven at its downstream end by a drive pulley 108. The drive pulley 108 is in turn driven by the first motor 96. The drive pulley 108 and idler pulley 110 are supported at opposite ends thereof on the support frames 73.

Referring especially to FIGS. 3 and 7–12, the second and third conveyors 92 and 94 in essence comprise mirror images of one another except for the fact that the second conveyor 92 is driven at a slower speed then the first conveyor 90, whereas the third conveyor 94 is driven at a faster speed then the first conveyor 90. Since the second and third conveyors 92 and 94 are essentially identical to one another, only the second conveyor 92 will be detailed.

The second conveyor 92 comprises a belt 112 supported on a drive pulley 114 at its downstream end, on an idler pulley 116 at its upstream end, and on a support bed 118 along its central portion. The drive pulley 114 is driven by the second motor 98 to drive the belt 112. The second motor 98, drive pulley 114, idler pulleys 116, and support bed 118 are all mounted on an adjustable support assembly 120 that permits adjustment of 1) the inclination of the second conveyor 92 relative to the first conveyor 90, 2) the height of the second conveyor 92 relative to the first conveyor 90, and 3) the lateral spacing between the first conveyor 90 and the second conveyor 92. The orientation and position of the second conveyor 92 therefore can be adjusted to accommodate articles of different sizes and/or weights. This adjustment capability is important because, for the article turner assembly 30 to operate properly, the second conveyor 92 must be positioned relative to the first conveyor 90 so that unturned articles do not contact the second conveyor 92 and so that turned articles contact the belt 112 of the second conveyor 92.

Figure 8:
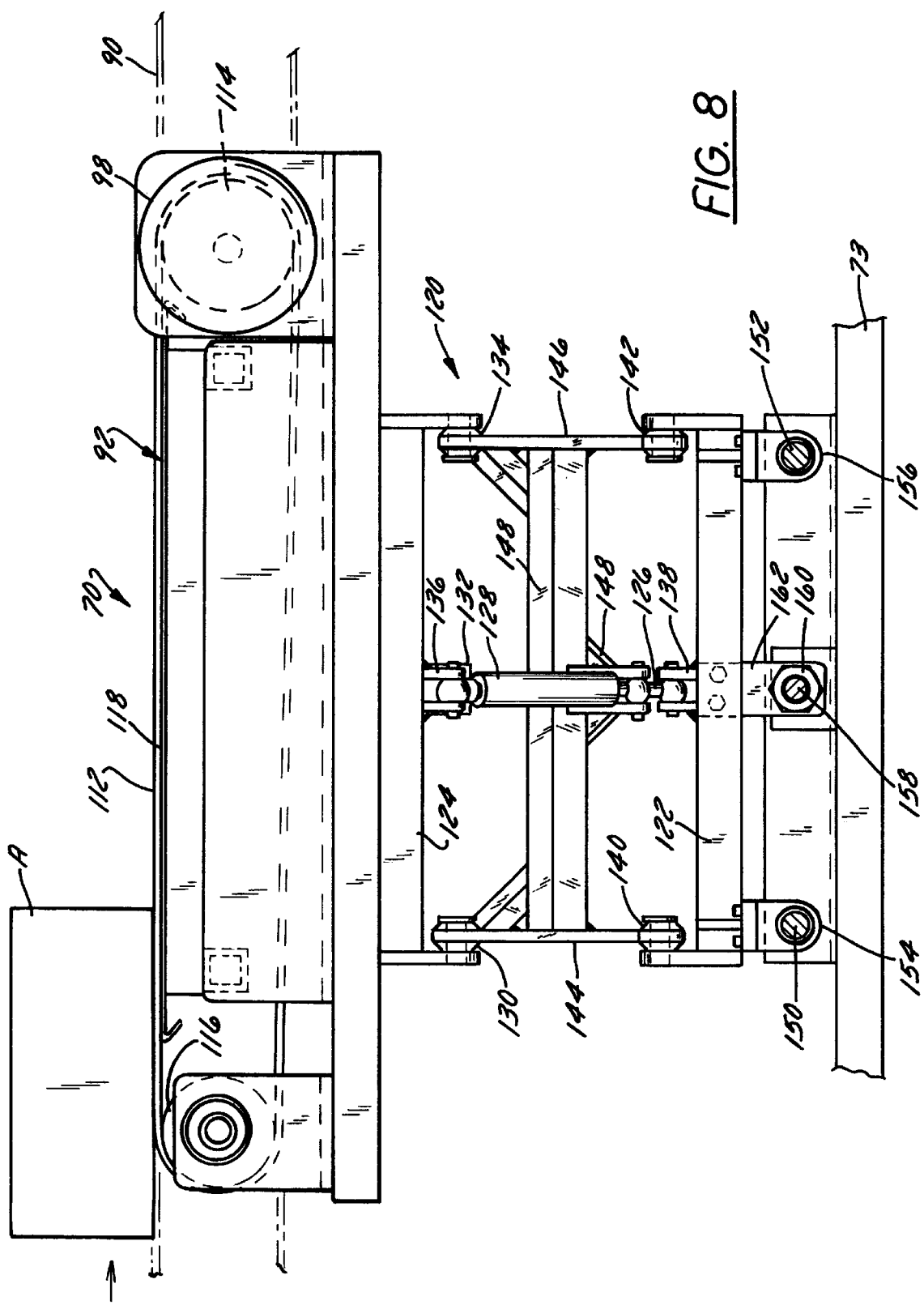
FIG. 8 is a side elevation view of a conveyor mechanism of the article turner assembly.
Figure 9:
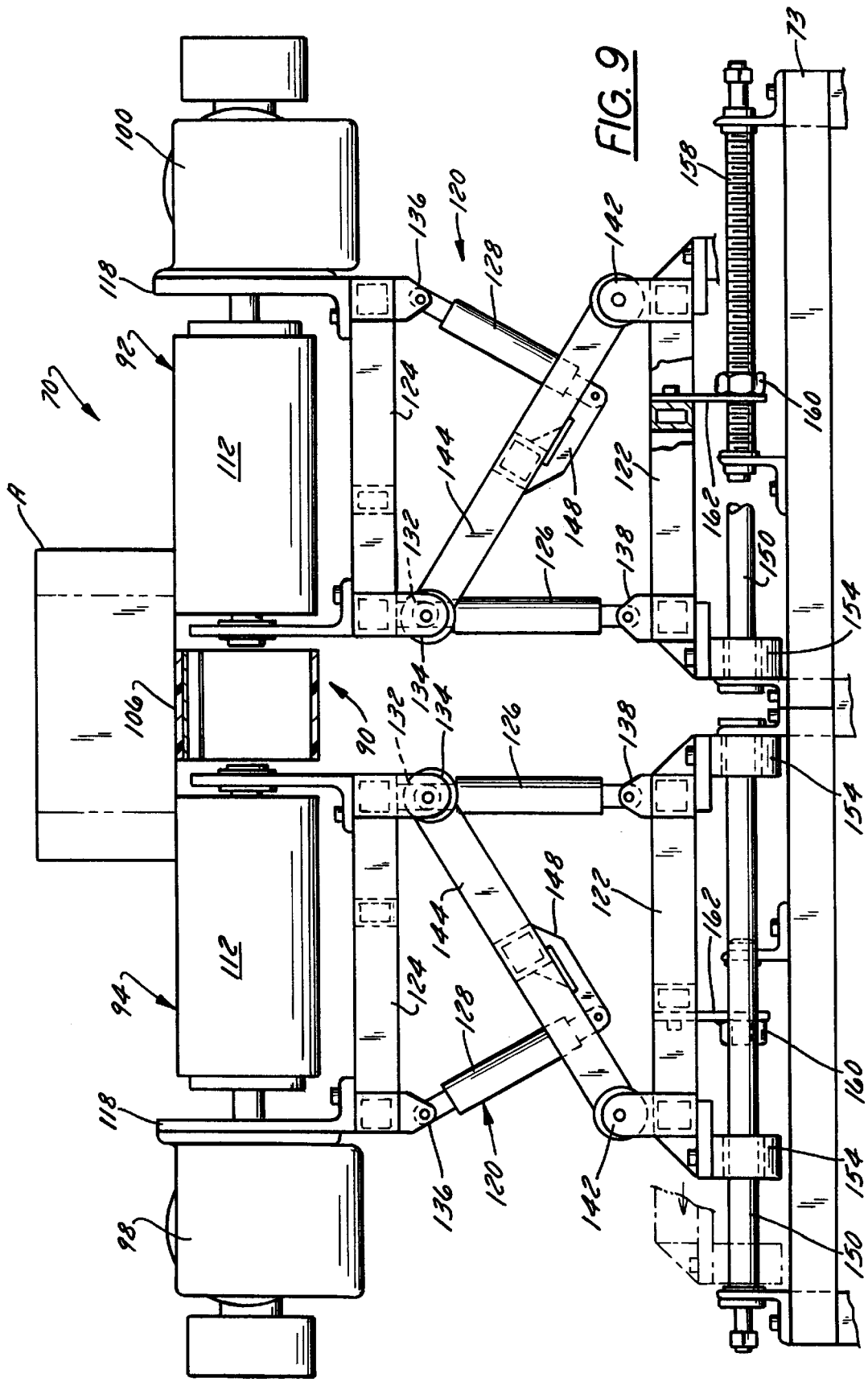
FIG. 9 is a sectional end elevation view of the conveyor mechanism, taken generally along the lines 9—9 in FIG. 3.
Figure 10:
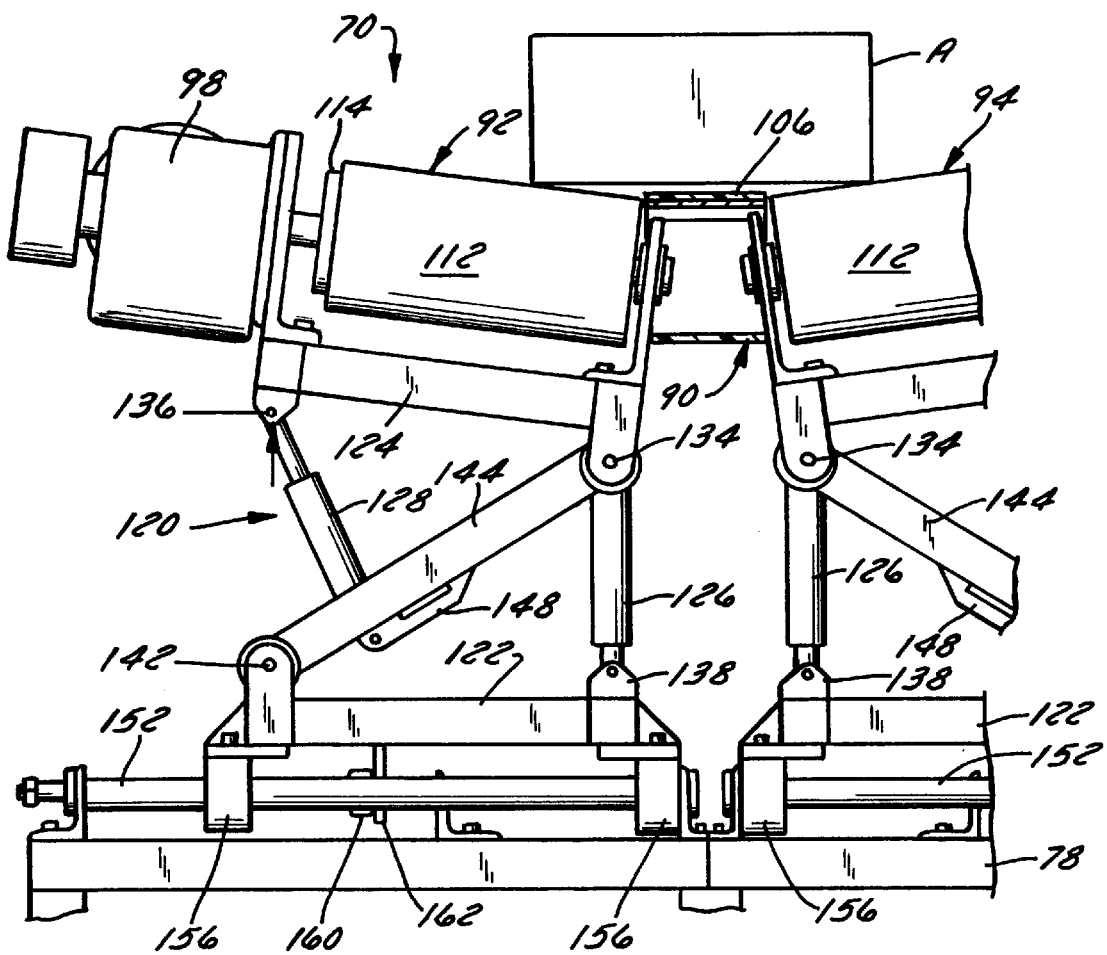
FIG. 10 is a fragmentary sectional end elevation view corresponding to FIG. 9 and illustrating a support assembly for one of the conveyors of the conveyor mechanism in an adjusted or moved position with respect to the corresponding position illustrated in FIG. 9.

Referring now particularly to FIGS. 8–10, the support assembly 120 includes a lower frame 122, an upper frame 124, and first and second laterally-spaced linear actuators 126 and 128 connecting the upper frame 124 to the lower frame 122. The linear actuators 126 and 128, which may comprise turnbuckles, stepper motors, or the like, can be extended and retracted to adjust the position of the upper frame 124 relative to the lower frame 122. The upper frame 124 supports the second motor 98, the drive pulley 114, the idler pulley 116, and the support bar 118. The upper frame 124 has 1) three longitudinally-spaced inner pivot mounts 130, 132, and 134 located laterally adjacent the first conveyor 90 and 2) a longitudinally-central pivot mount 136 located laterally remote from the first conveyor 90. The lower frame 122 has 1) a longitudinally-central inner pivot mount 138 located laterally adjacent the first conveyor 90 and 2) a pair of longitudinally-spaced outer pivot mounts 140 and 142 located laterally remote from the first conveyor 90. The second inner pivot mount 132 of the upper frame 124 is connected to the sole inner pivot mount 138 of the lower frame 122 by the first linear actuator 126. Two support arms 144 and 146 are provided at the upstream and downstream longitudinal ends of the support assembly 120 and are each pivotably connected at their upper end to one of the first and third inner pivot mounts 130 or 134 of the upper fame 124 and at their lower end to one of the first and second outer pivot mount 140 or 142 of the lower frame 122. A support brace 148 extends longitudinally between central portions of the first and second support arms 144 and 146. The second linear actuator 128 is pivotably connected at its lower end to a central longitudinal portion of the support brace 148 and at its upper end to the sole outer pivot mount 136 of the upper frame 124. As should be apparent, the first and second linear actuators 126 and 128 can be operated in conjunction with one another to raise and lower the upper frame 124 relative to the lower frame 122 and/or to alter the inclination of the upper frame 124 relative to the lower frame 122. Hence, the upper frame 124 is movable between a fully lowered, horizontal position as seen in FIG. 9 to a fully raised, inclined position, and virtually any position in between.

In addition, the lower frame 122 and hence the entire second conveyor 92 can be moved transversely relative to the first conveyor 90 using an adjuster screw arrangement best seen in FIGS. 8–10. The adjuster screw arrangement comprises a pair of longitudinally-spaced, laterally-extending support rods 150, 152 on which the lower frame 122 is supported via front and rear sets of bearing mounts 154 and 156. The adjuster screw arrangement further comprises a longitudinally-central, laterally-extending ball screw arrangement including 1) a rotatable screw 158 and 2) a nut 160 which is attached to a bar 162 extending downwardly from a longitudinally-central portion of the lower support frame 122. Rotation of the screw 158 manually or otherwise causes the nut 160 to move axially along the screw 158 and hence causes the entire second conveyor 92 to move laterally inwardly or outwardly along the support rods 150 and 152.

The position and/or orientation of the second conveyor 92 therefore can be adjusted in virtually any manner to accommodate articles of different sizes or different weights. This adjustment can best be seen by comparing FIGS. 13–15 with one another which show the second and third conveyors 92 and 94 positioned to accommodate a relatively small article in FIG. 13 and larger articles in FIGS. 14 and 15. These drawings illustrate that the second and third conveyors 92 and 94 are spread apart, lowered, and inclined less severely to accommodate larger articles. In practice, each of the second and third conveyors 92 and 94 is transversely movable along its respective adjuster screw arrangement by about 4", can be inclined through an angle of approximately 20°, and can be raised and lowered about 6".

Figure 7:
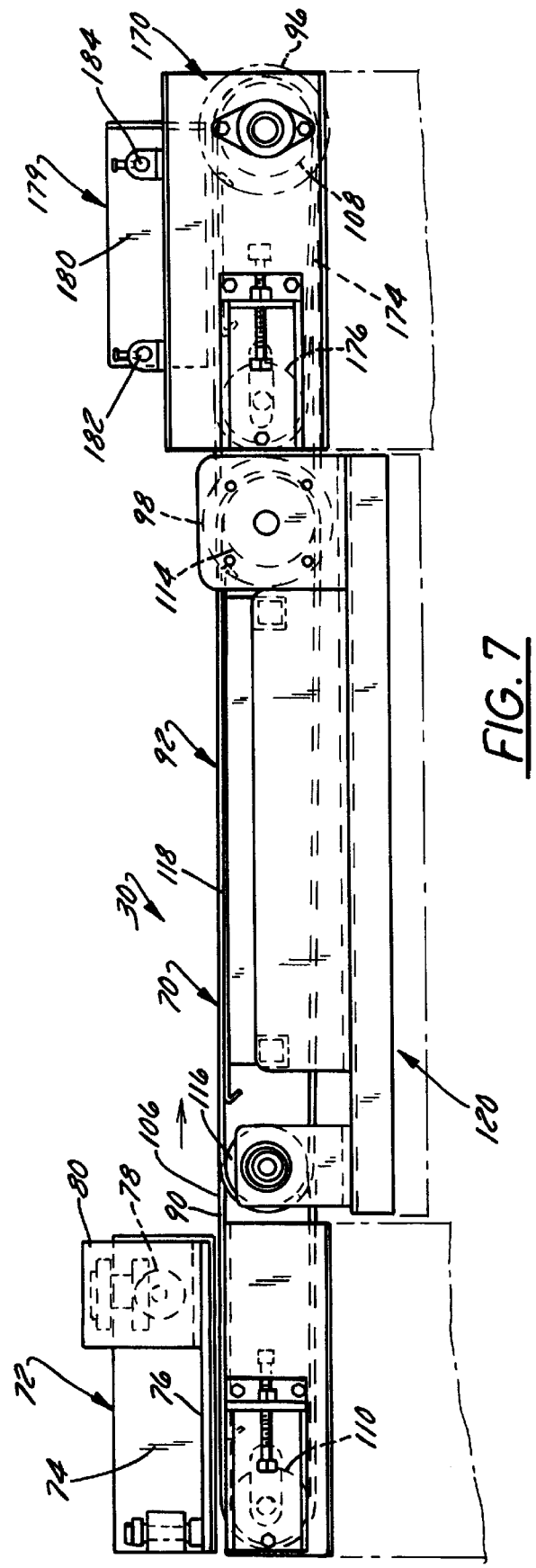
FIG. 7 is a side elevation view of the article turner assembly.

Although not essential to system operation, so-called "stubber" conveyors 170, 172 are preferably provided downstream of the second and third conveyors 92 and 94 and flank the first conveyor 90 to facilitate discharge of turned articles from the article turner assembly 30. As best seen in FIGS. 3 and 7, the stubber conveyors 170 and 172 are positioned in a common plane with the first conveyor 90 and are driven at the same speed as the first conveyor 90. In the illustrated embodiment, the stubber conveyors 170 and 172 comprise belts 174 driven by the same drive motor 96 for the belt 106 of the first conveyor 90. The belts 174 are supported at their downstream end on the same drive pulley 108 as the first belt 106 and are supported at their upstream end on a common idler pulley 176. The idler pulley 176 extends laterally across the conveyor mechanism 70 at a location downstream of the second and third conveyors 92 and 94 and is supported on the opposed frames 73 by respective ends of a support shaft.

A guide mechanism 179 is mounted above the upper surface of the downstream end of the stubber conveyors 170 and 172 and the first conveyor 90 to help square and center any turned articles that are slightly skewed or off-center as they arrive at the downstream end of the article turner assembly 30. This guide mechanism 179 preferably takes the form of first and second laterally-spaced converging guide bars 180. Each guide bar 180 is mounted on a respective one of the support frames 73 by first and second longitudinally-spaced, laterally-extending support rods 182 and 184. The support rods 182 and 184 are mounted on the frames 73 by set screws or some other structures permitting the adjustment of the support rods 182 and 184 with respect to a longitudinal centerline of the conveyor mechanism 70 so that the guide mechanism can accommodate articles of varying sizes.

In use, articles are conveyed onto the article turner assembly 30 from the infeed conveyor 28 in an unturned orientation at a relatively high speed of e.g., 220 articles per minute by driving the infeed conveyor 28 at about 300 ft/minute. The first conveyor 90 preferably is also driven at about 300 ft/min, whereas the second and third conveyors 92 and 94 travel about 250 ft/min and about 350 ft/min, respectively. The spacing between the incoming articles is very small—typically 8" or even less. Hence, any article turning must be achieved rapidly and with little or no article deceleration.

The linear actuators 78 of the selector mechanism 72 are not actuated if the incoming article is to remain in its unturned orientation. The guide device therefore maintains its undeflected orientation illustrated in solid lines in FIG. 3 in which the guide members 74 extend in parallel with the direction of article conveyance. In this case, the article A is conveyed through the belt turner assembly 30 so as to be supported only on the first or center conveyor 90 and hence does not contact the belt 112 of either of the second or third conveyors 92 or 94. The conveyed article therefore is not subjected to a speed differential and is not turned.

If, on the other hand, a selected article needs to be turned, the linear actuators 78 of the selector mechanism 72 are actuated, either under manual control or, more likely, under control of a computer preprogrammed to produce a desired downstream pattern. Actuation of the linear actuators 78 pivots the guide members 74 from the undeflected position illustrated in solid lines in FIG. 3 to the deflected positioned illustrated in phantom lines. As a result of this movement, the orientation of the next incoming article is altered slightly by the guide members 74 as best seen in FIG. 3 so that a lower portion of the front end thereof engages the belt 112 of the inclined second conveyor 92. The speed differential between the first conveyor 90 and the second conveyor 92 causes the article to rotate or spin about its center of gravity as it is conveyed further along the article turner assembly 30. However, due in part to the inclination of the second conveyor 92 relative to the first conveyor 90, the center of gravity of the turning article remains at or near the longitudinal centerline of the first conveyor 90, and there is little or no article deceleration. As the article continues to turn, a bottom rear portion thereof engages the faster moving third conveyor 94 so that the speed differential between the first and third conveyors 90 and 94 helps to continue to rotate the article so that the article rotates a full 90° by the time it reaches the downstream end of the conveyor mechanism 70 as illustrated in FIG. 3. This complete rotation occurs in only about 3 feet of linear travel and without appreciable deceleration of the turned article.

If for any reason the turned article is discharged from the conveyor mechanism 70 having overshot or undershot its desired 90° of rotation as is illustrated by the article A' in FIG. 3, the bars 180 of the guide mechanism 179 square and center the slightly-skewed turned article A' and onto the downstream slat sorter 32 in the correct orientation as seen in FIG. 3.

The selector mechanism 72 need only alter the orientation of the conveyed articles slightly to deflect them into engagement with the belt 112 of the second conveyor. The stroke of the linear actuators 78 and the resultant movement of the guide members 74 therefore are relatively small. As a result, the linear actuators 78 can by operated rapidly so that, if necessary, every other article can be turned. In addition, article deflection imparts very little impact on the deflected articles, and article turning takes place without impact and hence cannot damage either the conveyed articles or products or materials stored therein. Each article also is turned 1) at speed (i.e., without slowing down) and 2) in-line (i.e., without its center of gravity departing substantially from the longitudinal centerline of the first belt).

The invention is not limited to the disclosed article turner assembly 30. For instance, it is conceivable that the selector mechanism 72 could act on the article turner assembly 30 itself as opposed to on the conveyed articles. For instance, the selector mechanism could comprise a linear actuator or other lift device that selectively moves the second and third conveyors 92 and 94 relative to the first conveyor 90 such that they can selectively engage unturned articles traveling along the conveyor mechanism 70 in an in-line or unaltered orientation. For instance, the second and third conveyors 92 and 94 could alternatively be 1) lowered beneath the plane of the first conveyor 90 to permit articles to be conveyed through the article turner assembly 30 without being turned and 2) raised into or above the plane of the first conveyor 90 so that they engage and turn articles. This configuration would have the advantage of not requiring a separate selector mechanism that engages conveyed articles. However, it would have the disadvantage of prohibiting the simultaneous conveyance of turned and unturned articles on the same conveyor section. This disadvantage could be alleviated by separating the conveyor mechanism 70 into multiple conveyor mechanism sections which are aligned end-to-end so that the second and third or flanking conveyors of each section can be raised and lowered by the selector mechanism independently of the second and third conveyors of the upstream and downstream sections. In this event, the conveyor mechanism sections could be controlled to "chase" turned or unturned articles so that turned articles are always supported on all three conveyors and so that unturned articles are always supported on only the center conveyor.

Many changes and modifications could be made to the invention as described herein without departing from the spirit thereof. The scope of some of these changes are discussed above. The scope of other changes will become apparent from the appended claims.

We claim:

1. An article turner assembly for use with a conveyor mechanism that conveys articles in a single lane along a path, the assembly comprising:

a first conveyor;

a second conveyor which is driven at a different speed than and is positioned laterally and adjacent and to the first conveyor; and a selector mechanism operable to cause individual articles which are not to be turned to be conveyed by only the first conveyor and to cause articles which are to be turned to be conveyed by both the first and second conveyors.

2. An article turner assembly as claimed in claim 1, further comprising:

a third conveyor positioned adjacent and substantially parallel to the first conveyor and the second conveyor.

3. An article turner assembly as claimed in claim 1, further comprising:

an adjustable support assembly on which the second conveyor is mounted.

4. An article turner assembly as claimed in claim 2, further comprising:

an adjustable support on which the third conveyor is mounted.

5. An article turner assembly comprising:

(A) a conveyor mechanism including
  (1) a first conveyor, and
  (2) a second conveyor which is positioned beside said first conveyor and which is driven at a different speed than said first conveyor; and (B) a selector mechanism operable to selectively direct articles being delivered to said conveyor mechanism so as to either 1) contact only said first conveyor so as not to be turned, or 2) contact both said first and second conveyors so as to be turned by a speed differential between said first conveyor and said second conveyor.

6. An article turner assembly as defined in claim 5, wherein said first and second conveyors comprise belt conveyors.

7. An article turner assembly as defined in claim 5, wherein said conveyor mechanism further comprises a third conveyor which is positioned beside said first conveyor opposite said second conveyor so that said second and third conveyors flank said first conveyor, wherein said second conveyor is driven at a lower speed than said first conveyor, and wherein said third conveyor is driven at a higher speed than said first conveyor.

8. An article turner assembly as defined in claim 7, wherein said second and third conveyors are inclined with respect to said first conveyor so that said first, second, and third conveyors, in combination, assume a generally V-shape when viewed in transverse cross-section.

9. An article turner assembly as defined in claim 5, wherein said conveyor mechanism further comprises an adjustable support assembly on which said second conveyor is mounted and which permits adjustment of the position of said second conveyor relative to said first conveyor.

10. An article turner assembly as defined in claim 9, wherein said support assembly permits adjustment of at least one of 1) an inclination of said second conveyor, 2) a height of said second conveyor, and 3) a spacing between a longitudinal centerline of said second conveyor and a longitudinal centerline of said first conveyor.

11. An article turner assembly as defined in claim 9, wherein said support assembly comprises a lower frame;

an upper frame on which said second conveyor is mounted; and first and second laterally-spaced linear actuators connecting said upper frame to said lower frame and operable, in conjunction with one another, to raise and lower said upper frame with respect to said lower frame and to vary an inclination of said upper frame with respect to said lower frame.

12. An article turner assembly as defined in claim 11, wherein said support assembly further comprises a lateral adjust mechanism which is connected to said lower frame and which selectively moves said lower frame, said upper frame, and said second conveyor laterally with respect to said first conveyor.

13. An article turner assembly comprising:

a conveyor mechanism including a moving surface and which conveys articles in a single lane along a path;

an article turner including said moving surface of said conveyor mechanism; and a selector mechanism which acts on at least one of 1) said article turner and 2) conveyed articles so as to cause some articles to be turned by said article turner as they are conveyed along said path while permitting other articles to be conveyed along said path without being turned, wherein said conveyor mechanism includes at least first and second conveyors extending at least generally in parallel with one another, wherein said second conveyor is driven at a different speed than said first conveyor so that differentially-moving conveying surfaces of said first and second conveyors, in combination, form said article turner, and wherein said selector mechanism acts on articles and causes articles which are not to be turned to be conveyed by only said first conveyor and causes articles which are to be turned to be conveyer by both said first conveyor and said second conveyor.

14. An article turner assembly as defined in claim 13, wherein said first and second conveyors comprise belt conveyors.

15. An article turner assembly as defined in claim 13, wherein said second conveyor is positioned so that 1) articles which are directed onto said conveyor mechanism in an in-line orientation do not contact said second conveyor and are not turned and 2) articles which are directed onto said conveyor mechanism in an altered orientation contact said second conveyor and are turned, and wherein said selector mechanism comprises a movable guide device which is disposed in the vicinity of an inlet of said conveyor and which is movable between 1) a first position in which it directs articles onto said conveyor mechanism in said in-line orientation and 2) a second position in which it directs articles onto said conveyor mechanism in said altered orientation.

16. An article turner assembly as defined in claim 15, wherein said movable guide device comprises 1) a pair of laterally-spaced guide members, each being pivotably mounted on a support member at an upstream end longitudinal thereof, and 2) a pair of linear actuators, each of which is attached to one of said guide members downstream of said upstream longitudinal end thereof, said linear actuators being selectively actuatable to pivot said guide members so as to move said guide device between said first position and said second position.

17. An article turner assembly as defined in claim 16, wherein each of said guide members comprises a flat bar.

18. An article turner assembly as defined in claim 13, wherein said conveyor mechanism further comprises a third conveyor which is positioned beside said first conveyor opposite said second conveyor so that said second and third conveyors flank said first conveyor, wherein said second conveyor is driven at a lower speed than said first conveyor, and wherein said third conveyor is driven at a higher speed than said first conveyor.

19. An article turner assembly as defined in claim 18, wherein said second and third conveyors are inclined with respect to said first conveyor so that said first, second, and third conveyors, in combination, assume a generally V-shape when viewed in transverse cross-section.

20. An article turner assembly as defined in claim 19, wherein the positions of said second and third conveyors are adjustable relative to a position of said first conveyor.

21. An article turner assembly as defined in claim 13, wherein said selector mechanism acts on conveyed articles.

22. An article turner assembly as defined in claim 21, wherein said selector mechanism comprises a movable guide device which is disposed in the vicinity of an inlet of said conveyor mechanism and which is movable between 1) a first position in which it directs articles onto said conveyor mechanism in a first, in-line orientation and 2) a second position in which it directs articles onto said conveyor mechanism in a second, altered orientation.

23. An article turner assembly as defined in claim 22, wherein said movable guide device comprises 1) a pair of laterally-spaced guide members, each being pivotably mounted on a support member at an upstream longitudinal end thereof, and 2) a pair of linear actuators, each of which is attached to one of said guide members downstream of said upstream longitudinal end thereof, said linear actuators being selectively actuatable to pivot said guide members so as to move said guide device between said first position and said second position.

24. An article turner assembly as defined in claim 23, wherein said guide members are movable transversely with respect to one another so as to alter an average lateral spacing therebetween to accommodate articles of different sizes.

* * * * *